US009858266B2

(12) United States Patent
Makino et al.

(10) Patent No.: US 9,858,266 B2
(45) Date of Patent: Jan. 2, 2018

(54) CALCULATING CORRELATIONS BETWEEN ANNOTATIONS

(71) Applicant: International Business Machines Corporation, Armonk, NY (US)

(72) Inventors: Yuki Makino, Tokyo (JP); Takuma Murakami, Tokyo (JP); Daisuke Takuma, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 331 days.

(21) Appl. No.: 14/658,347

(22) Filed: Mar. 16, 2015

(65) Prior Publication Data

US 2015/0278312 A1    Oct. 1, 2015

(30) Foreign Application Priority Data

Mar. 27, 2014 (JP) ................................. 2014-066947

(51) Int. Cl.
- *G06F 17/30* (2006.01)
- *G06F 17/28* (2006.01)
- *G06F 17/24* (2006.01)

(52) U.S. Cl.
CPC ............ *G06F 17/28* (2013.01); *G06F 17/241* (2013.01); *G06F 17/30525* (2013.01)

(58) Field of Classification Search
CPC ... G06F 17/28; G06F 17/241; G06F 17/30525
See application file for complete search history.

(56) References Cited

U.S. PATENT DOCUMENTS

| 7,020,561 B1* | 3/2006 | McLoughlin ........... G06F 19/28 702/19 |
| 7,596,549 B1* | 9/2009 | Issa .................... G06F 17/30038 |

(Continued)

FOREIGN PATENT DOCUMENTS

| JP | 2013536491 A | 9/2013 |
| WO | 2010119615 A1 | 10/2010 |
| WO | 2013147304 A1 | 10/2013 |

OTHER PUBLICATIONS

Unknown, "Decision to Grant a Patent" for patent titled "A device and a method of calculating correlation of an annotation," Patent Application No. 2014-066947, dated Apr. 14, 2016, translated Oct. 28, 2016, 6 pages.

(Continued)

*Primary Examiner* — Huawen A Peng
(74) *Attorney, Agent, or Firm* — Mark G. Edwards (57) ABSTRACT

An apparatus for calculating a correlation between annotations includes a first obtaining unit configured to provide an annotator with a first data group capable of being evaluated to determine whether or not to attach annotations thereto, and obtaining a plurality of first confidence levels indicating certainty of the annotations in the first data group, the annotator outputting confidence levels indicating certainty of annotations to be attached to data when the data is given; a second obtaining unit configured to provide the annotator with a second data group used to calculate a correlation between the plurality of annotations, and thereby obtaining a plurality of second confidence levels indicating the certainty of the annotations in the second data group; and a computing unit configured to compute an estimated value of the correlation between the plurality of annotations based on the plurality of first and second confidence levels.

8 Claims, 10 Drawing Sheets

(56) References Cited

U.S. PATENT DOCUMENTS

| | | | |
|---|---|---|---|
| 2004/0205542 A1* | 10/2004 | Bargeron | G06F 17/241 715/201 |
| 2006/0047647 A1* | 3/2006 | Kuboyama | G10L 15/26 |
| 2007/0150802 A1* | 6/2007 | Wan | G06F 17/241 715/205 |
| 2009/0083010 A1* | 3/2009 | Qi | G06K 9/00711 703/2 |

OTHER PUBLICATIONS

Makino, et al., "Calculating Correlations Between Annotations," Translated Drawings, filed Mar. 27, 2014, 10 pages.
Makino, et al., "Calculating Correlations Between Annotations," Translated Application, filed Mar. 27, 2014, 32 pages.
List of IBM Patents or Patent Applications Treated as Related; Date File: Mar. 16, 2015, pp. 1-2.
Yuki Mankino, et al.,"Calculating Correlations Between Annotations," U.S. Appl. No. 14/748,313, filed Jun. 24, 2015.
B.B. Chaudhuri, et al., "On Correlation Between Two Fuzzy Sets," Fuzzy Sets and Systems, 118, 2001, pp. 447-456.

* cited by examiner

| DOCUMENT ID | ANNOTATION a | | ANNOTATION b | |
|---|---|---|---|---|
| | CORRECT ANSWER INFORMATION | SCORE | CORRECT ANSWER INFORMATION | SCORE |
| L1 | true | 0.8 | false | 0.1 |
| L2 | false | 0.1 | false | 0.2 |
| L3 | true | 0.3 | true | 0.7 |
| : | : | : | : | : |

Figure 5

| DOCUMENT ID | ANNOTATION a | ANNOTATION b |
|---|---|---|
| | SCORE | SCORE |
| D1 | 0 | 0.2 |
| D2 | 0.3 | 0.5 |
| D3 | 1 | 0.1 |
| : | : | : |

|  | b IS INCLUDED | b IS NOT INCLUDED |
|---|---|---|
| a IS INCLUDED | $X_{abi}$ | $X_{ai} - X_{abi}$ |
| a IS NOT INCLUDED | $X_{bi} - X_{abi}$ | $1 + X_{abi} - X_{ai} - X_{bi}$ |

CALCULATING CORRELATIONS BETWEEN ANNOTATIONS

FOREIGN PRIORITY

This application claims priority to Japanese Patent Application No. 2014-066947, filed Mar. 27, 2014, and all the benefits accruing therefrom under 35 U.S.C. §119, the contents of which in its entirety are herein incorporated by reference.

BACKGROUND

The present invention relates to an apparatus and a method of calculating a correlation between annotations.

Information attached to data such as text by pattern matching, natural language processing or the like is referred to as "annotation." Conceivable annotations, for example, include an annotation, such as a product name or a price, extracted and attached by string pattern matching, an annotation "heat problem" attached through interpretation of expressions "smoke came out" and "it smelled," and the like.

It may be desirable to know a correlation between such annotations. For example, it may be desirable to know a correlation between Annotations a and b in order to check if Problem b is more likely to occur in Product a than in common products.

Here, there is a known technique related to attachment of annotations to text. In particular, WO2010/119615 discloses that a learning-data generating device is provided with a learning-data candidate clustering unit that conducts clustering of multiple learning-data candidates that have had labels indicating an annotation class given thereto, based on the amount of feature including context information thereof; and a learning-data generating unit that refers to each of the clusters obtained as a result of the clustering, obtains a distribution of the labels of the learning-data candidates within each of the clusters, specifies the learning-data candidates that satisfy configured conditions based on the obtained distribution, and generates learning-data using the specified learning-data candidates.

Moreover, there is also a known technique of calculating a correlation between two fuzzy sets. The publication of B. B. Chaudhuri, A. Bhattacharya, "On correlation between two fuzzy sets", Fuzzy Sets and Systems 118 (2001) 447-456, discloses calculation of a correlation between two fuzzy sets using Spearman's rank correlation coefficient.

SUMMARY

In one embodiment, an apparatus for calculating a correlation between annotations includes a first obtaining unit configured to provide an annotator with a first data group capable of being evaluated to determine whether or not to attach annotations thereto, and thereby obtaining a plurality of first confidence levels each indicating certainty of each of a plurality of the annotations in the first data group, the annotator outputting at least confidence levels indicating certainty of annotations to be attached to data when the data is given; a second obtaining unit configured to provide the annotator with a second data group used to calculate a correlation between the plurality of annotations, and thereby obtaining a plurality of second confidence levels each indicating the certainty of each of the plurality of annotations in the second data group; and a computing unit configured to compute an estimated value of the correlation between the plurality of annotations based on the plurality of first confidence levels and the plurality of second confidence levels.

In another embodiment, a method of calculating a correlation between annotations in a computer includes providing, using a processing device, an annotator with a first data group capable of being evaluated to determine whether or not to attach annotations thereto, and thereby obtaining a plurality of first confidence levels each indicating certainty of each of a plurality of the annotations in the first data group, the annotator outputting at least confidence levels indicating certainty of annotations to be attached to data when the data is given; providing the annotator with a second data group used to calculate a correlation between the plurality of annotations, and thereby obtaining a plurality of second confidence levels each indicating the certainty of each of the plurality of annotations in the second data group; and computing an estimated value of the correlation between the plurality of annotations based on the plurality of first confidence levels and the plurality of second confidence levels.

In another embodiment, non-transitory, computer readable storage medium has instructions stored thereon that, when executed by a computer, implements a method of calculating a correlation between annotations. The method includes providing, using a processing device, an annotator with a first data group capable of being evaluated to determine whether or not to attach annotations thereto, and thereby obtaining a plurality of first confidence levels each indicating certainty of each of a plurality of the annotations in the first data group, the annotator outputting at least confidence levels indicating certainty of annotations to be attached to data when the data is given; providing the annotator with a second data group used to calculate a correlation between the plurality of annotations, and thereby obtaining a plurality of second confidence levels each indicating the certainty of each of the plurality of annotations in the second data group; and computing an estimated value of the correlation between the plurality of annotations based on the plurality of first confidence levels and the plurality of second confidence levels.

BRIEF DESCRIPTION OF THE DRAWINGS

FIG. 7($a$) is a graph illustrating a distribution of Score $Y_1$ in documents with $X_i=1$;

FIG. 7($b$) is a graph illustrating a distribution of Score $Y_0$ in documents with $X_i=0$;

DETAILED DESCRIPTION

An estimated value of a correlation between annotations, incidentally, varies depending on performance of an annotator that attaches the annotations to data. The low performance of the annotator causes a problem of impossibility of finding an estimated value close to a correlation between true annotations. It should be noted that the above described techniques do not present an approach for solving such a problem.

Accordingly, aspects of the present invention calculation of the estimated value close to the correlation between the true annotations regardless of the performance of the annotator.

In particular, an apparatus for calculating a correlation between annotations includes a first obtaining unit for giving an annotator a first data group capable of being evaluated to determine whether or not to attach annotations thereto, and thereby obtaining a plurality of first confidence levels each indicating certainty of each of a plurality of the annotations in the first data group, the annotator outputting at least confidence levels indicating certainty of annotations to be attached to data when the data is given; a second obtaining unit for giving the annotator a second data group used to calculate a correlation between the plurality of annotations, and thereby obtaining a plurality of second confidence levels each indicating the certainty of each of the plurality of annotations in the second data group; and a computing unit for computing an estimated value of the correlation between the plurality of annotations based on the plurality of first confidence levels and the plurality of second confidence levels.

In this apparatus, the first obtaining unit may obtain the plurality of first confidence levels by giving the annotator the first data group to be evaluated to determine that the annotations should not be attached thereto, and the computing unit may compute a plurality of first representative values by performing a process of finding the first representative value of each of the plurality of first confidence levels in the first data group, for the plurality of first confidence levels, and compute the estimated value of the correlation between the plurality of annotations, by using the plurality of first representative values and the plurality of second confidence levels.

In that case, the computing unit may compute the estimated value of the correlation between the plurality of annotations, according to a formula for computation in which deviation from a reference value of the correlation between the plurality of annotations becomes large as any of the plurality of first representative values becomes large. Moreover, in the computation of the estimated value of the correlation between the plurality of annotations, according to the formula for computation including a term divided by an expression of subtracting any of the plurality of first representative values from a second representative value of any of the plurality of second confidence levels in the second data group, the computing unit may increase a value of the expression.

Moreover, the computing unit may compute the estimated value of the correlation between the plurality of annotations, according to a formula for computation in which the plurality of first representative values are used to correct an expression of dividing a third representative value of a product of the plurality of second confidence levels in the second data group by a product of a plurality of second representative values that are obtained by performing a process of finding the second representative value of each of the plurality of second confidence levels in the second data group, for the plurality of second confidence levels.

Moreover, in this apparatus, the first obtaining unit may give the annotator the first data group to be evaluated to determine that the annotations should not be attached thereto, and thereby obtain two first confidence levels each indicating certainty of each of two annotations in the first data group; the second obtaining unit may give the annotator the second data group used to calculate a correlation between the two annotations, and thereby obtain two second confidence levels each indicating the certainty of each of the two annotations in the second data group; and the computing unit may compute two average values $\mu^*_{a0}$ and $\mu^*_{b0}$ by performing a process of finding an average value of each of the two first confidence levels in the first data group, for the two first confidence levels, compute two average values $E^*_a$ and $E^*_b$ by performing a process of finding an average value of each of the two second confidence levels in the second data group, for the two second confidence levels, compute an average value $E^*_{ab}$ of a product of the two second confidence levels in the second data group, and compute an estimated value $c^*$ of the correlation between the two annotations according to a formula for computation as follows:

$$c^* = 1 + \frac{E^*_{ab} - E^*_a E^*_b}{(E^*_a - \mu^*_{a0})(E^*_b - \mu^*_{b0})} \qquad \text{Equation 1}$$

Furthermore, the present invention also provides a method of calculating a correlation between annotations in a computer, including giving an annotator a first data group capable of being evaluated to determine whether or not to attach annotations thereto, and thereby obtaining a plurality of first confidence levels each indicating certainty of each of a plurality of the annotations in the first data group, the annotator outputting at least confidence levels indicating certainty of annotations to be attached to data when the data is given; in the computer, giving the annotator a second data group used to calculate a correlation between the plurality of annotations, and thereby obtaining a plurality of second confidence levels each indicating the certainty of each of the plurality of annotations in the second data group; and in the computer, computing an estimated value of the correlation between the plurality of annotations based on the plurality of first confidence levels and the plurality of second confidence levels.

In this method, obtaining the plurality of first confidence levels may include obtaining the plurality of first confidence levels by giving the annotator the first data group to be evaluated to determine that the annotations should not be attached thereto, and computing the estimated value of the correlation between the plurality of annotations may include computing a plurality of first representative values by performing a process of finding the first representative value of each of the plurality of first confidence levels in the first data group, for the plurality of first confidence levels, and include computing the estimated value of the correlation between the plurality of annotations, by using the plurality of first representative values and the plurality of second confidence levels.

Furthermore, the present invention also provides a program product for causing a computer to function as an apparatus for calculating a correlation between annotations, in which the program product causes the computer to execute any of the above methods.

According to embodiments of the present invention, it is possible to calculate the estimated value close to the correlation between the true annotations regardless of the performance of the annotator.

An embodiment of the present invention will be described in detail below with reference to the accompanying drawings.

Figure 1:
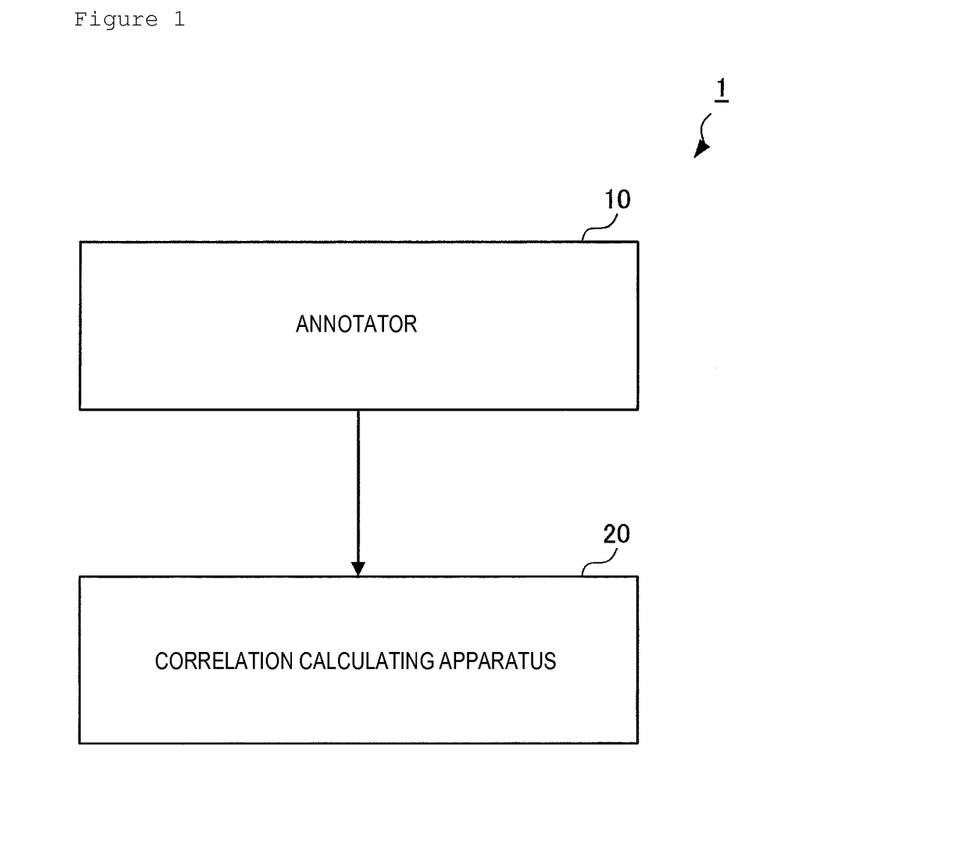
FIG. 1 is a diagram illustrating an overall configuration example of a correlation calculating system in an embodiment of the present invention.

FIG. 1 is a diagram illustrating an overall configuration example of a correlation calculating system 1 in the present embodiment. As illustrated, this correlation calculating system 1 includes an annotator 10 and a correlation calculating apparatus 20.

The annotator 10 is an apparatus that attaches annotations and scores as an example of confidence levels indicating certainty of the annotations, to given data. The correlation calculating apparatus 20 is an apparatus that calculates a correlation between a plurality of the annotations attached to the data by the annotator 10.

In recent years, since apparatuses that attach scored annotations to data according to a statistical-based approach, similarly to the annotator 10, have increased, there is a need to present a correlation between the scored annotations with an indicator that is understandable to ordinary users. In that regard, while any indicator may be used as the indicator indicating the correlation between the annotations, it is desirable to be able to define the indicator as an extension of a density ratio that is preferred by the users.

Accordingly, the present embodiment uses the density ratio as the indicator indicating the correlation between the annotations. Here, the density ratio is a ratio of the density of data having all the plurality of annotations attached thereto, to a product of the densities of data having each of the plurality of annotations attached thereto. For example, if a density ratio representing a correlation between Annotations a and b is c; a set of all data is D; a data set including data having Annotation a attached thereto is A; and a data set including data having Annotation b attached thereto is B, the density ratio c is computed according to "c=#(A∩B)#D/ (#A#B)" ("#S" denotes the number of elements of a set S in the present specification). Such an interpretation as "Problem b is likely to occur in Product a c-times more than in common products" has thereby become possible, and the density ratio has also been increasingly used in machine learning in recent years.

The present embodiment focuses attention on a problem of such a density ratio being computed to be low in the case where the annotator 10 is not perfect.

Figure 2:
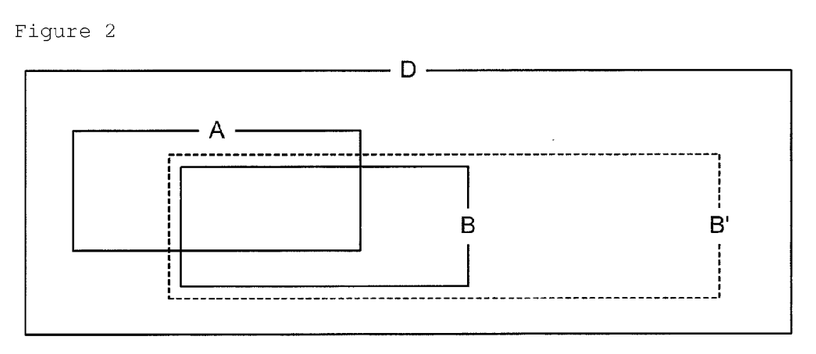
FIG. 2 is a diagram for describing a problem of a density ratio being computed to be low in the case of an imperfect annotator.

FIG. 2 is a diagram for describing this problem. Also in this diagram, it is assumed that D denotes the set of all data, A denotes a set of data truly including Annotation a, and B denotes a set of data truly including Annotation b. A true density ratio of Annotations a and b is then #(A∩B)#D/ (#A#B), as described above. In such a state, if a precision of the annotator 10 for Annotation b is low, the set of data having Annotation b attached thereto becomes like B'. A value to be computed as the density ratio of Annotations a and b is then #(A∩B')#D/(#A#B'). Here, since A, B and B' are smaller than D, #(A∩B) is not so much different from #(A∩B'). The fact that #B' is larger than #B in the denominator, however, is not negligible, and thus there is a problem in that the density ratio computed in the case of a low precision of the annotator 10 for Annotation b becomes smaller than the true density ratio.

Accordingly, in the present embodiment, average values of scores of annotations attached to negative example data (data to which the annotations should not be attached) are used to calculate an estimated value of the true density ratio at a test stage in the annotator 10 if such average values are known.

It should be noted that documents will be described below as an example of the data to which the annotations are attached. Moreover, two Annotations a and b will be described as an example of the annotations to be attached to the data for which the correlation is calculated.

Figure 3:
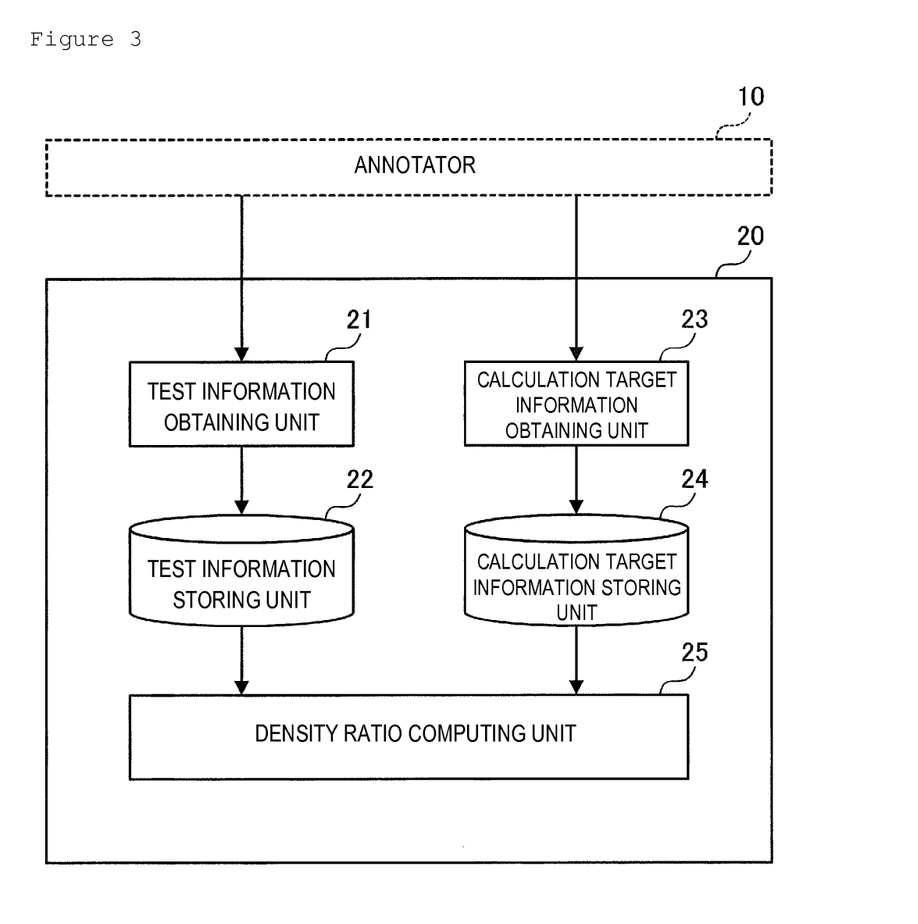
FIG. 3 is a block diagram illustrating a functional configuration example of a correlation calculating apparatus in the embodiment of the present invention.

FIG. 3 is a block diagram illustrating a functional configuration example of the correlation calculating system, particularly of the correlation calculating apparatus 20, in the present embodiment. As illustrated, this correlation calculating apparatus 20 is provided with a test information obtaining unit 21, a test information storing unit 22, a calculation target information obtaining unit 23, a calculation target information storing unit 24, and a density ratio computing unit 25.

The test information obtaining unit 21 obtains test information consisting of two pieces of correct answer information each indicating whether or not to attach each of Annotations a and b to a test document group used to test the annotator 10, and two scores each indicating the certainty of each of Annotations a and b attached to the test document group by the annotator 10. Here, the correct answer information is, in supervised learning, information on whether or not to attach Annotations a and b, which has already been set for each test document of the test document group, and in unsupervised learning, the correct answer information is information on whether or not to attach Annotations a and b, which can be obtained by evaluation of each test document of the test document group. In other words, the test document group includes a negative example document group consisting of negative example documents to which Annotations a and b should not be attached, as indicated by the correct answer information. Moreover, the scores are numerical values greater than or equal to 0 and smaller than or equal to 1. In the present embodiment, the test document group is used as an example of a first data group that can be evaluated to determine whether or not to attach annotations thereto; the negative example document group is used as an example of the first data group that is evaluated to determine that the annotations should not be attached thereto; and the two scores are used as an example of a plurality of first confidence levels each indicating certainty of each of a plurality of the annotations in the first data group. Moreover, the test information obtaining unit 21 is provided as an example of a first obtaining unit for obtaining the plurality of first confidence levels.

The test information storing unit 22 stores the test information obtained by the test information obtaining unit 21. A specific example of the test information will be described later.

The calculation target information obtaining unit 23 obtains calculation target information consisting of two scores each indicating the certainty of each of Annotations a and b attached by the annotator 10 to a calculation target document group used to calculate the correlation between Annotations a and b. Here, the scores are numerical values greater than or equal to 0 and smaller than or equal to 1, and are information obtained from indices through search for Annotations a and b. In the present embodiment, the calculation target document group is used as an example of a second data group used to calculate a correlation between the plurality of annotations; and the two scores are used as an example of a plurality of second confidence levels each indicating the certainty of each of the plurality of annotations in the second data group. Moreover, the calculation target information obtaining unit 23 is provided as an example of a second obtaining unit for obtaining the plurality of second confidence levels.

The calculation target information storing unit 24 stores the calculation target information obtained by the calculation target information obtaining unit 23. A specific example of the calculation target information will be described later.

The density ratio computing unit 25 computes an estimated value of the density ratio with the test information stored in the test information storing unit 22 and the calculation target information stored in the calculation target information storing unit 24. This estimated value of the density ratio is then stored in a storage device such as a magnetic disk device 20g (see FIG. 10), or is displayed on a display mechanism 20d (see FIG. 10). In the present embodiment, the estimated value of the density ratio is used as an example of an estimated value of the correlation between the plurality of annotations; and the density ratio computing unit 25 is provided as an example of a computing unit for computing the estimated value of the correlation.

Figure 4:
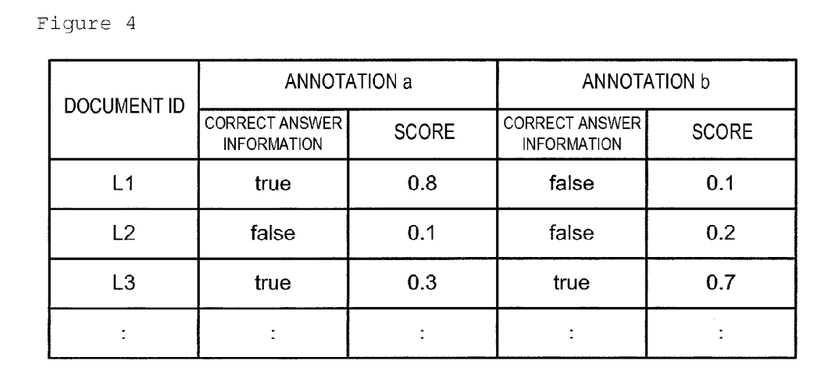
FIG. 4 is a diagram illustrating an example of test information stored in a test information storing unit of the correlation calculating apparatus in the embodiment of the present invention.

FIG. 4 is a diagram illustrating an example of the test information stored in the test information storing unit 22. As illustrated, the test information provides the correspondence among a document ID, the correct answer information and the score regarding Annotation a, as well as the correct answer information and the score regarding Annotation b. For example, for a document having the document ID of "L1," it is illustrated that Annotation a should be attached thereto and the score of Annotation a that has actually been attached is 0.8, and that Annotation b should not be attached thereto and the score of Annotation b that has actually been attached is 0.1.

It should be noted that, in the present embodiment, while the test information is described as the information consisting of the correct answer information and the score, the number of documents to which the annotation should be added may be the test information if the precision is known at the annotator 10 that gives 0 or 1 as the score of the annotation. The density ratio computing unit 25 computes an average value of the score of the annotation because the density ratio computing unit 25 can compute the value according to "the density of the document to which the annotation should be attached×(1−precision)."

Figure 5:
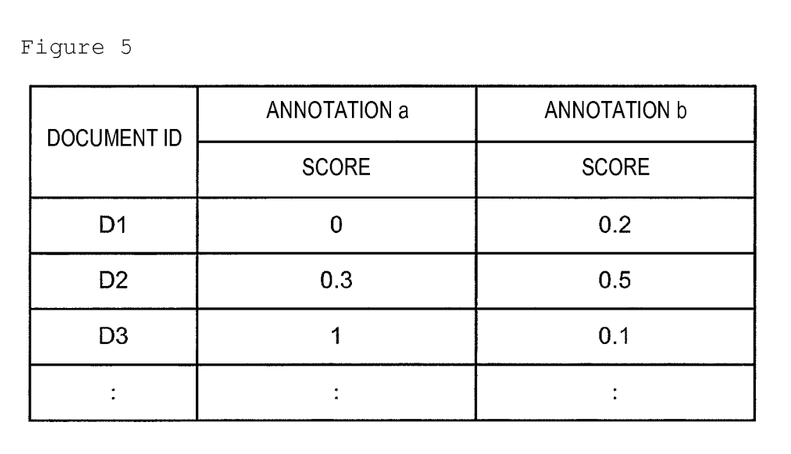
FIG. 5 is a diagram illustrating an example of calculation target information stored in a calculation target information storing unit of the correlation calculating apparatus in the embodiment of the present invention.

FIG. 5 is a diagram illustrating an example of the calculation target information stored in the calculation target information storing unit 24. As illustrated, the calculation target information provides the correspondence among the document ID, the score of Annotation a, and the score of Annotation b. For example, for a document having the document ID of "D1," it is illustrated that the score of Annotation a that has actually been attached is 0, and the score of Annotation b that has actually been attached is 0.2.

In the correlation calculating apparatus 20 in the present embodiment, as described above, the test information obtaining unit 21 first obtains the test information and stores the information in the test information storing unit 22, and the calculation target information obtaining unit 23 obtains the calculation target information and stores the information in the calculation target information storing unit 24.

Figure 6:
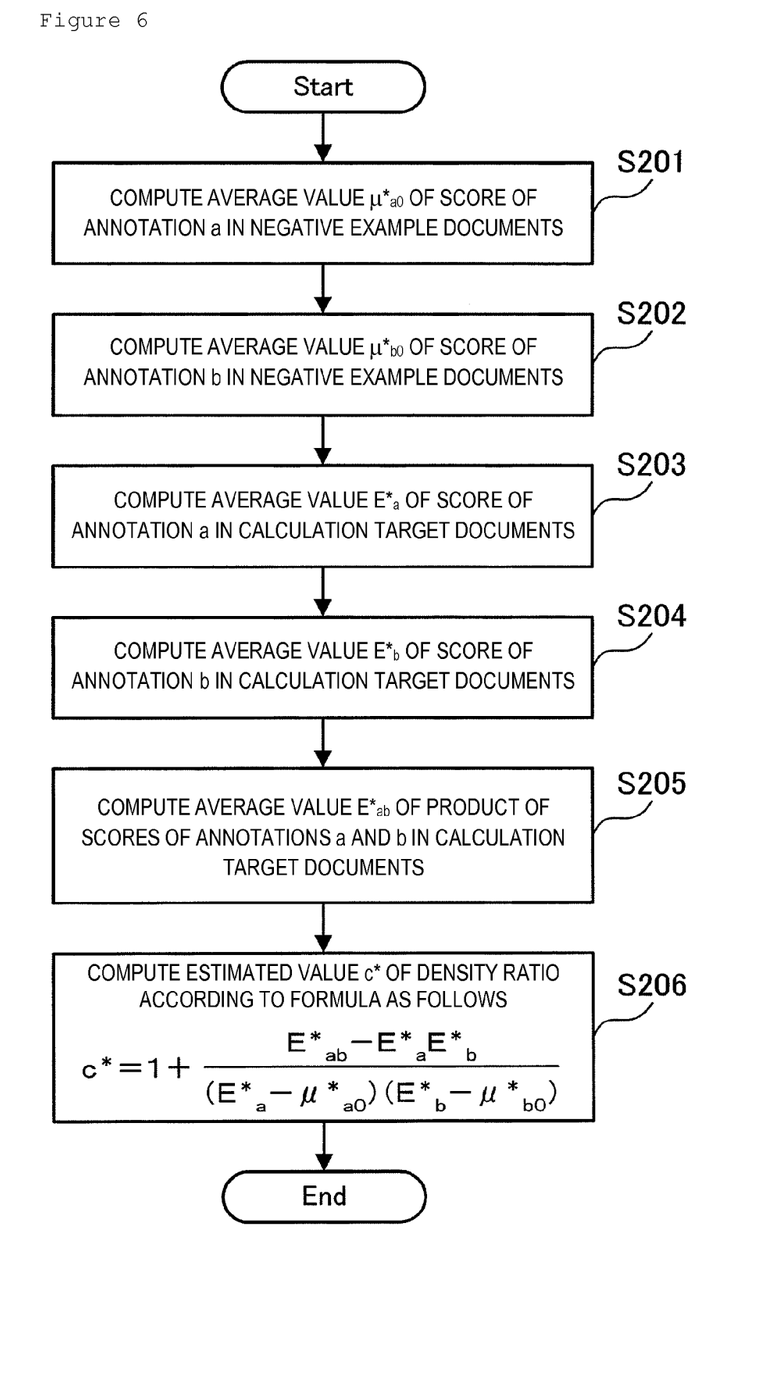
FIG. 6 is a flowchart illustrating an operation example of a density ratio computing unit of the correlation calculating apparatus in the embodiment of the present invention.

The density ratio computing unit 25 then computes the estimated value of the density ratio with the test information stored in the test information storing unit 22 and the calculation target information stored in the calculation target information storing unit 24. FIG. 6 is a flowchart illustrating an operation example of the density ratio computing unit 25 at this time.

As illustrated, the density ratio computing unit 25 first computes an average value $\mu^*_{a0}$ of the score of Annotation a in the negative example documents for Annotation a (the documents to which Annotation a should not be attached) (S201). Specifically, the test information regarding the negative example documents for Annotation a, that is, the test information having the correct answer information regarding Annotation a of "false" is extracted from the test information stored in the test information storing unit 22. Subsequently, the average value of the score of Annotation a included in this test information becomes $\mu^*_{a0}$.

The density ratio computing unit 25 also computes an average value $\mu^*_{b0}$ of the score in the negative example documents for Annotation b (the documents to which Annotation b should not be attached) (S202). Specifically, the test information regarding the negative example documents for Annotation b, that is, the test information having the correct answer information regarding Annotation b of "false" is extracted from the test information stored in the test information storing unit 22. Subsequently, the average value of the score of Annotation b included in this test information becomes $\mu^*_{b0}$.

The density ratio computing unit 25 next computes an average value $E^*_a$ of the score of Annotation a in calculation target documents (S203). Specifically, the average value of the score of Annotation a included in the calculation target information stored in the calculation target information storing unit 24 becomes $E^*_a$.

The density ratio computing unit 25 also computes an average value $E^*_b$ of the score of Annotation b in the calculation target documents (S204). Specifically, the average value of the score of Annotation b included in the calculation target information stored in the calculation target information storing unit 24 becomes $E^*_b$.

The density ratio computing unit 25 further computes an average value $E^*_{ab}$ of a product of the scores of Annotations a and b in the calculation target documents (S205). Specifically, the average value of the product of the score of Annotation a and the score of Annotation b in each of all the documents included in the calculation target information stored in the calculation target information storing unit 24 becomes $E^*_{ab}$.

The density ratio computing unit 25 next computes an estimated value c of the density ratio with $\mu^*_{a0}$ computed in step 201, $\mu^*_{b0}$ computed in step 202, $E^*_a$ computed in step 203, $E^*_b$ computed in step 204, and $E^*_{ab}$ computed in step 205 (step 206). Specifically, the estimated value c* of the density ratio is computed according to a formula for computation as follows.

$$c^* = 1 + \frac{E^*_{ab} - E^*_a E^*_b}{(E^*_a - \mu^*_{a0})(E^*_b - \mu^*_{b0})} \qquad \text{Equation 2}$$

Here, $\mu^*_{a0}$ and $\mu^*_{b0}$ are an example of a plurality of first representative values obtained by performing a process of finding the first representative value of each of the plurality of first confidence levels in the first data group, for the plurality of first confidence levels. $E^*_a$ and $E^*_b$ are an example of a plurality of second representative values obtained by performing a process of finding the second representative value of each of the plurality of second confidence levels in the second data group, for the plurality of second confidence levels. $E^*_{ab}$ is an example of a third representative value of a product of the plurality of second confidence levels in the second data group. In other words, in the present embodiment, all of $\mu^*_{a0}$, $\mu^*_{b0}$, $E^*_a$, $E^*_b$ and $E^*_{ab}$ are the average values, which may be other representative values such as median values.

It should be noted that this formula for computation can be generalized and understood as such a formula for computation in which deviation from a reference value of the correlation between Annotations a and b becomes large as $\mu_{a0}$ or $\mu^*_{b0}$ becomes large.

When this formula for computation is used, however, a problem occurs if $(E^*_a - \mu^*_{a0})$ or $(E^*_b - \mu^*_{b0})$ is small, that is, if there is no difference between the score in a positive example document and the score in the negative example document due to poor accuracy of the annotator 10. In such a case, while an existing approach provides no correlation, the formula for computation approaches an indeterminate form of 0÷0 and the values become unstable in the present embodiment, which is the problem. Since the occurrence of this problem can be determined based on smallness of the denominator and the numerator, the smaller of $(E^*_a - \mu^*_{a0})$ and $(E^*_b - \mu_{b0})$ may be changed to be a larger value through interval estimation or the like to approach "no correlation" ($c^*=1$). This process can be generalized and understood as a process of, in computation of an estimated value of the correlation between Annotations a and b, according to the formula for computation including a term divided by an expression of subtracting any of $\mu^*_{a0}$ or $\mu^*_{b0}$ from any of $E^*_a$ or $E^*_b$, increasing a value of the expression.

Derivation of Formula for Computation of Density Ratio

A method of deriving this formula for computing the estimated value $c^*$ of the density ratio will be described in detail below.

A document set consisting of an infinite number of documents including an annotation at a probability of p will be considered first. When N documents are extracted from this document set, a random variable $X_i$ representing presence or absence of a true annotation is defined for Document i (i=0, 1, . . . , N). Specifically, the random variable $X_i$ is defined so that $X_i=1$ if the annotation is present in Document i, and $X_i=0$ if the annotation is not present in Document i. Thereby, assuming that the random variable $X_i$ is i.i.d (independent and identically distributed), that is, independent and identically distributed, $E(X_i)=p$. Here, a score of the annotation that is actually attached to a document by the annotator 10 is defined as $Y_1$ for the document with $X_i=1$, and defined as $Y_0$ for the document with $X_i=0$. The score of the annotation in a document that has been randomly sampled without knowledge of the true annotation can then be represented as follows.

$$X_i Y_i + (1-X_i) Y_0$$

It should be noted that, in the above expression, since $Y_1$ when $X_i=0$ and $Y_0$ when $X_i=1$ do not affect the scores, $Y_1$ and $Y_0$ are defined to be identically distributed regardless of $X_i$, that is, independent of $X_i$, for convenience.

Figure 7A:
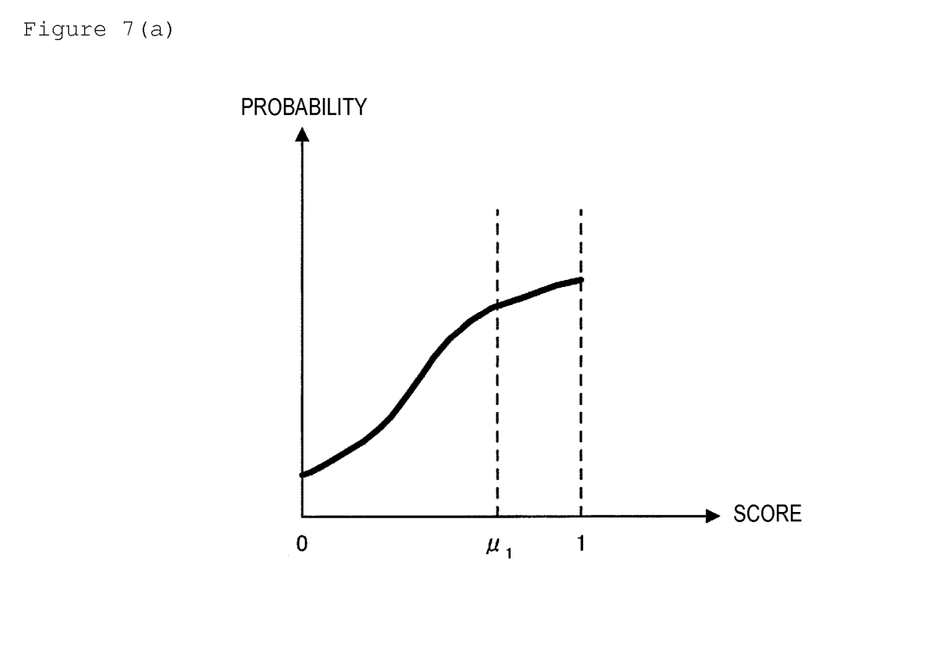
Figure 7B:
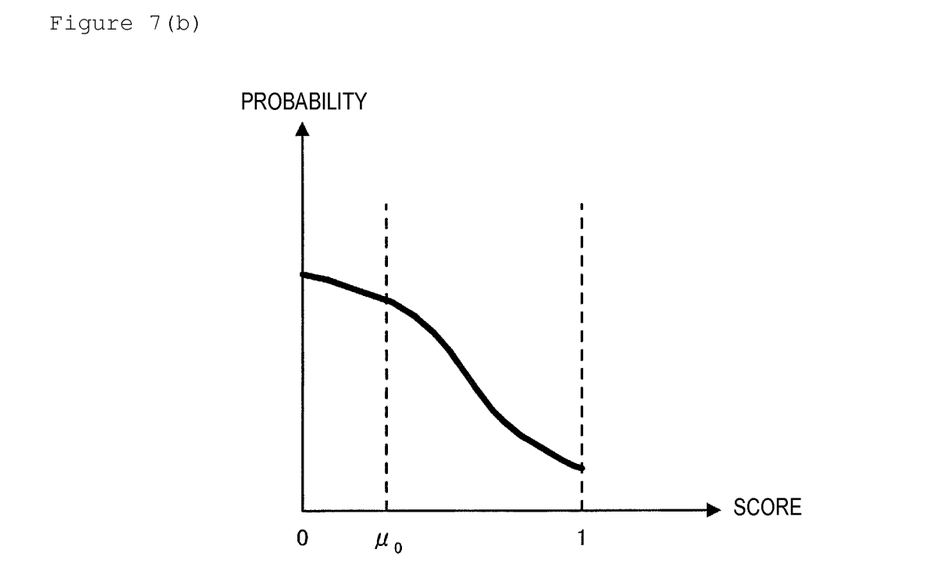

FIG. 7(a) is a graph illustrating the distribution of Score $Y_1$ in the documents with $X_i=1$. Although the graph will be shaped to project at a probability of $Y_1=1$ if the accuracy of the annotator 10 is high, the graph generally has the shape with the high probability of $Y_1=1$ while the probability decreases toward $Y_1=0$, as illustrated. The graph also illustrates an average value $\mu_1$ of Score $Y_1$ ($\mu_1=E(Y_1)$). Moreover, FIG. 7(b) is a graph illustrating the distribution of Score $Y_0$ in the documents with $X_i=0$. Although the graph will be shaped to project at a probability of $Y_0=0$ if the accuracy of the annotator 10 is high, the graph generally has the shape with the high probability of $Y_0=0$ while the probability decreases toward $Y_0=1$, as illustrated. The graph also illustrates an average value $\mu_0$ of Score $Y_0$ ($\mu_0=E(Y_0)$).

Next, for two kinds of Annotations a and b, similarly to the above description, existence probabilities of the true annotations are denoted as $p_a$ and $p_b$; random variables representing the presence or absence of the true annotations are denoted as $X_{ai}$ and $X_{bi}$; random variables representing the scores of the annotations in the positive example documents are denoted as $Y_{a1}$ and $Y_{b1}$; and random variables representing the scores of the annotations in the negative example documents are denoted as $Y_{a0}$ and $Y_{b0}$, respectively. The average values of the scores are then defined as follows.

$$E_a := E(X_{ai} Y_{a1} + (1-X_{ai}) Y_{a0}), \mu_{a1} := E(Y_{a1}), \mu_{a0} := E(Y_{a0})$$

$$E_b := E(X_{bi} Y_{b1} + (1-X_{bi}) Y_{b0}), \mu_{b1} := E(Y_{b1}), \mu_{b0} := E(Y_{b0})$$

In this state, if a density ratio indicating the degree of Annotations a and b being truly attached to an identical document is c, a probability of Annotations a and b being attached to the identical document becomes $cp_a p_b$. If $X_{abi}$ is a random variable that becomes 1 when Document i includes both of Annotations a and b, and that otherwise becomes 0, it becomes as follows.

$$E(X_{abi}) = c p_a p_b$$

Figure 8:
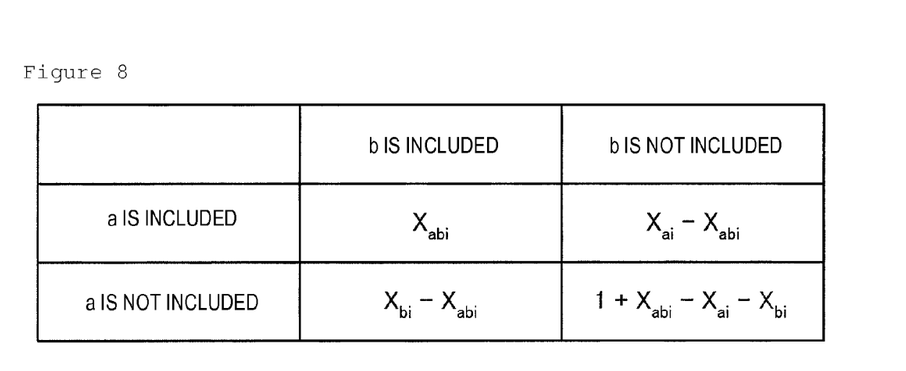
FIG. 8 is a diagram illustrating a random variable that becomes 1 only if it corresponds to each pattern of four patterns indicating presence or absence of Annotations a and b in Document i, and that otherwise becomes 0.

FIG. 8 illustrates a random variable that becomes 1 only if it corresponds to each pattern of four patterns indicating the presence or absence of Annotations a and b in Document i, and that otherwise becomes 0. This is used to consider a random variable representing the product of the scores of Annotations a and b in each document as follows.

$$X_{abi} Y_{a1} Y_{b1} + (X_{ai} - X_{abi}) Y_{a1} Y_{b0} + (X_{bi} - X_{abi}) Y_{a0} Y_{b1} + (1 + X_{abi} - X_{ai} - X_{bi}) Y_{a0} Y_{b0} = X_{abi} (Y_{a1} - Y_{a0})(Y_{b1} - Y_{b0}) + X_{ai} (Y_{a1} - Y_{a0}) Y_{b0} + X_{bi} (Y_{b1} - Y_{b0}) Y_{a0} + Y_{a0} Y_{b0}$$

It should be noted that $Y_{a1}$ and $Y_{b1}$ as well as $Y_{a0}$ and $Y_{b0}$ can be regarded to be independent except in special statuses, such as a status of the annotations themselves in a competitive relationship, and a status of a=b.

Here, an expected value $E_{ab}$ of the above random variable is calculated with $E(X_{ai})=p_a$, $E(X_{bi})=p_b$, $E(X_{ab})=c\,p_a\,p_b$, $E(Y_{a1})=\mu_{a1}$, $E(Y_{a0})=\mu_{a0}$, $E(Y_{b1})=\mu_{b1}$, and $E(Y_{b0})=\mu_{b0}$, as follows.

$$\begin{aligned} E_{ab} &= c\, p_a\, p_b (\mu_{a1} - \mu_{a0})(\mu_{b1} - \mu_{b0}) + \\ &\quad p_a(\mu_{a1} - \mu_{a0})\mu_{b0} + p_b(\mu_{b1} - \mu_{b0})\mu_{a0} + \mu_{a0}\mu_{b0} \\ &= c\, p_a\, p_b(\mu_{a1} - \mu_{a0})(\mu_{b1} - \mu_{b0}) - \\ &\quad p_a\, p_b(\mu_{a1} - \mu_{a0})(\mu_{b1} - \mu_{b0}) + \\ &\quad p_a\, p_b(\mu_{a1} - \mu_{a0})(\mu_{b1} - \mu_{b0}) + \\ &\quad p_a(\mu_{a1} - \mu_{a0})\mu_{b0} + p_b(\mu_{b1} - \mu_{b0})\mu_{a0} + \mu_{a0}\mu_{b0} \end{aligned}$$

-continued $$= (c-1)p_a \ p_b(\mu_{a1} - \mu_{a0})(\mu_{b1} - \mu_{b0}) +$$
$$(p_a(\mu_{a1} - \mu_{a0}) + \mu_{a0})(p_b(\mu_{b1} - \mu_{b0}) + \mu_{b0})$$

This is represented with $E_a$, $E_b$, $E_{ab}$ as well as $\mu_{a0}$ and $\mu_{b0}$, which can be directly estimated, as follows.

$$E_{ab} = (c-1)(E_a - \mu_{a0})(E_b - \mu_{b0}) + E_a E_b$$

The following formula can thereby be obtained.

$$c = 1 + \frac{E_{ab} - E_a E_b}{(E_a - \mu_{a0})(E_b - \mu_{b0})} \qquad \text{Equation 3}$$

Here, $E_a$, $E_b$, $\mu_{a0}$ and $\mu_{b0}$ can be estimated from $E^*_a$, $E^*_b$, $\mu^*_{a0}$ and $\mu^*_{b0}$, and $E_{ab}$ can be estimated from $E^*_{ab}$ that is obtained by dividing the sum of the product of the scores of Annotations a and b in each of all the documents by the number of all the documents. Accordingly, it means that c*, which is the estimated value of c, can be estimated from only observable values. This estimated value c* is a continuous function of consistent estimators $E_a$, $E_b$, $E_{ab}$, $\mu_{a0}$ and $\mu_{b0}$, and thus is a consistent estimator.

It should be noted that this formula equals a formula representing an ordinary density ratio, for a perfect annotator 10 that gives 1 as the score of the annotation to the positive example document and gives 0 as the score of the annotation to the negative example document.

It is, incidentally, also conceivable to calculate such a density ratio representing the correlation between the annotations, according to a fuzzy set operation. Accordingly, an advantageous effect of the present embodiment will be described here in comparison with the case of calculation of an existing formula with a fuzzy set.

In order to measure the effect, the following condition has been employed. In other words, the number of all the documents has been set to 1000000. Document densities of documents including Annotations a and b have been set to 2% and 5%, respectively. Moreover, the true density ratio has been set to 2.5. The number of the test documents for calculating $\mu^*_{a0}$ and $\mu^*_{b0}$ has been set to 10000.

Figure 9:
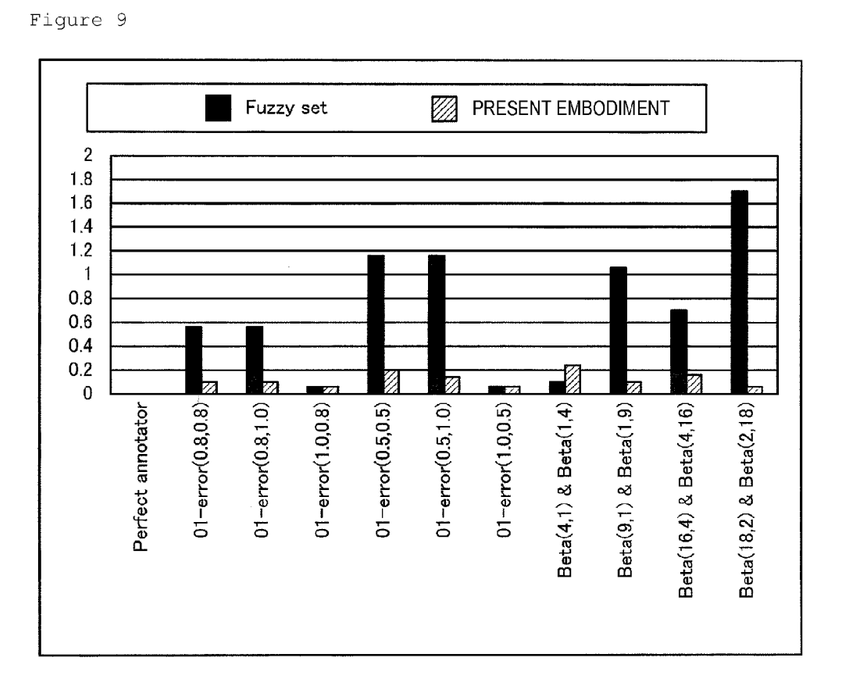
FIG. 9 is a graph illustrating an advantageous effect of the embodiment of the present invention in comparison with the case of calculation of an existing formula with a fuzzy set.

FIG. 9 is a graph illustrating a result of the measurement of the effect under such a condition. In the graph, the vertical scale represents an average value of the difference between the estimated value of the density ratio and the true density ratio in 100 measurements. Moreover, the horizontal scale represents models of the scores in the annotator 10. 01-error (p,r) is a model of attaching 1 or 0 so that the precision is p and the recall ratio is r. Moreover, Beta($\alpha,\beta$) & Beta($\beta,\alpha$) is a beta-distributed model in which a positive example is denoted as Beta($\alpha,\beta$) and a negative example is denoted as Beta($\beta,\alpha$). Moreover, a black series denotes the case of the calculation of the existing formula with the fuzzy set, and a diagonally hatched series denotes the case of using the approach of the present embodiment.

As seen in this graph, in the case of the calculation of the existing formula with the fuzzy set, under the effect of performance of the annotator 10, the estimated value of the density ratio is likely to deviate from the true density ratio at a low precision level.

Correlation among Three or More Annotations

While the case of the computation of the correlation between two annotations has been described above, a correlation among n Annotations $a_1, a_2, \ldots, a_n$ may also be similarly calculated with values obtained as follows ($n \geq 3$).

At the first stage, a random variable representing a product of scores of Annotations $a_1, a_2, \ldots, a_n$ in each document is considered, and its expected value is represented with the following values.

A density ratio

Expected values of the scores of Annotations $a_1$, $a_2, \ldots, a_n$ in the negative example documents Expected values of products of the scores of one to (n−1) annotations of Annotations $a_1, a_2, \ldots, a_n$ in each document (an expected value of the score of Annotation $a_1$, an expected value of the product of the scores of Annotations $a_1$ and $a_2$, an expected value of the product of the scores of Annotations $a_1$, $a_2$ and $a_3$, and the like)

At the second stage, a formula set up at the first stage is solved for the density ratio.

As an example, a formula for computation of the estimated value c* of the density ratio in the case of n=3 is described as follows.

$$c^* = 1 + \frac{\begin{array}{c}E^*_{uvw} - E^*_u E^*_v E^*_w - \mu^*_{u0}(E^*_{vw} - E^*_v E^*_w) - \\ \mu^*_{v0}(E^*_{uw} - E^*_u E^*_w) - \mu^*_{w0}(E^*_{uv} - E^*_u E^*_v)\end{array}}{(E^*_u - \mu^*_{u0})(E^*_v - \mu^*_{v0})(E^*_w - \mu^*_{w0})} \qquad \text{Equation 4}$$

It should be noted that, here, three annotations are Annotations u, v and w. Moreover, $E^*_u$, $E^*_v$ and $E^*_w$ are average values of scores of Annotations u, v and w in the calculation target documents, respectively; $E^*_{uv}$, $E^*_{uw}$, $E^*_{vw}$ and $E^*_{uvw}$ are average values of products of the scores of Annotations u and v, Annotations u and w, Annotations v and w, as well as Annotations u, v and w in the calculation target documents, respectively; and $\mu^*_{u0}$, $\mu^*_{v0}$ and $\mu^*_{w0}$ are average values of the scores of Annotations u, v and w in the negative example documents, respectively.

As described above, in the present embodiment, the average values of the respective scores of the n annotations in the negative example document group; the average values of the respective scores of the n annotations in the calculation target document group; and the average value of the product of the scores of the n annotations in each calculation target document in the calculation target document group are computed, and the estimated value of the correlation among the n annotations is computed based on these average values. This has enabled calculation of the estimated value close to the correlation among the true annotations regardless of the performance of the annotator.

Figure 10:
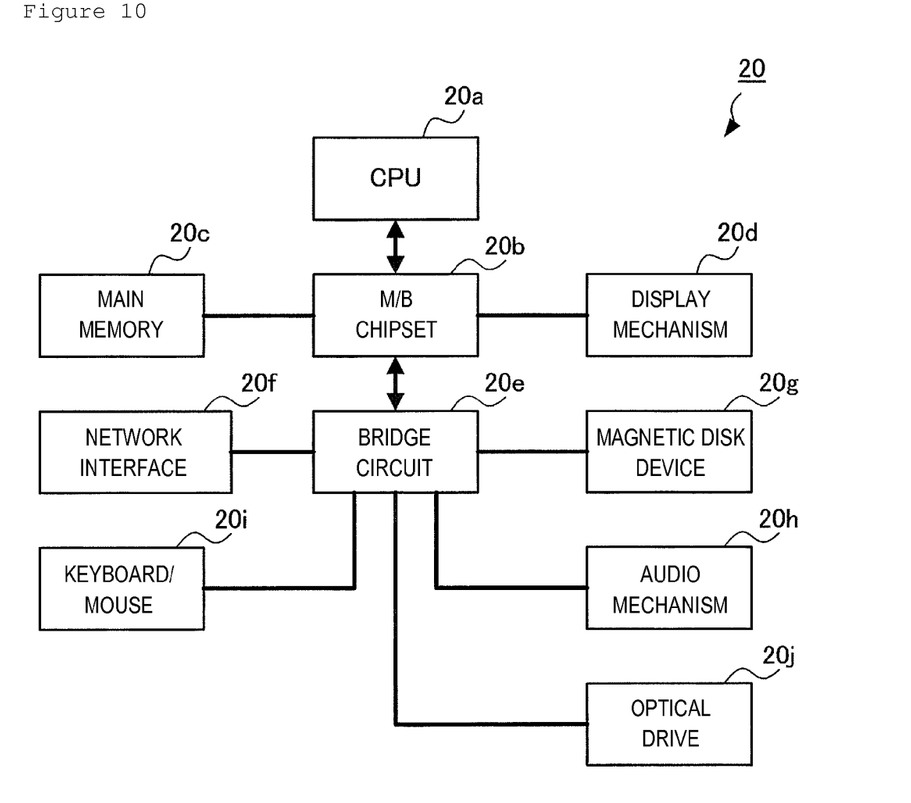
FIG. 10 is a diagram illustrating a hardware configuration example of the correlation calculating apparatus in the embodiment of the present invention.

FIG. 10 is a diagram illustrating a hardware configuration example of the correlation calculating apparatus 20 in the present embodiment. As illustrated, the correlation calculating apparatus 20 is provided with a CPU (Central Processing Unit) 20a that is operation means, a main memory 20c connected to the CPU 20a via an M/B (mother board) chipset 20b, and the display mechanism 20d that is similarly connected to the CPU 20a via the M/B chipset 20b. Moreover, a network interface 20f, the magnetic disk device (HDD) 20g, an audio mechanism 20h, a keyboard/mouse 20i and an optical drive 20j are connected to the M/B chipset 20b via a bridge circuit 20e.

It should be noted that components are connected through a bus in FIG. 10. The CPU 20a and the M/B chipset 20b, or the M/B chipset 20b and the main memory 20c, for example, are connected through a CPU bus. Moreover, while the M/B chipset 20b and the display mechanism 20d may be connected via an AGP (Accelerated Graphics Port), if the display mechanism 20d includes a PCI Express-enabled video card, the M/B chipset 20b and this video card are connected through a PCI Express (PCIe) bus. Moreover, in the case of connection to the bridge circuit 20e, for example, PCI Express may be used for the network interface 20f. Moreover, for the magnetic disk device 20g, for example, serial ATA (AT Attachment), parallel transfer ATA, and PCI (Peripheral Components Interconnect) may be used. Furthermore, for the keyboard/mouse 20i and the optical drive 20j, USB (Universal Serial Bus) may be used.

Here, the present invention may be achieved completely in hardware, or may be achieved completely in software. The present invention may also be achieved in both hardware and software. Moreover, the present invention may be achieved as a computer, a data processing system, or a computer program. This computer program may be stored and provided in a computer-readable medium. Here, an electronic medium, a magnetic medium, an optical medium, an electromagnetic medium, an infrared or semiconductor system (device or equipment), or a propagation medium is conceivable as the medium. Moreover, a semiconductor, a solid-state storage device, a magnetic tape, a removable computer diskette, a random access memory (RAM), a read only memory (ROM), a rigid magnetic disk, and an optical disk are exemplified as the computer-readable medium. Examples of the optical disk at the present time include a compact disk-read only memory (CD-ROM), a compact disk-read/write (CD-R/W), and a DVD.

While the present invention has been described above with the embodiment, the technical scope of the present invention is not limited to the above described embodiment. It is apparent to those skilled in the art that various modifications can be made and alternative aspects can be adopted without deviating from the spirit and scope of the present invention

REFERENCE SIGNS LIST

10 . . . annotator,
20 . . . correlation calculating apparatus,
21 . . . test information obtaining unit,
22 . . . test information storing unit,
23 . . . calculation target information obtaining unit,
24 . . . calculation target information storing unit,
25 . . . density ratio computing unit

The invention claimed is:

1. A computer system for automatically annotating electronic documents by calculating correlations between sets of annotations, comprising:
a first obtaining unit to,
transmit a first data group to an annotator, wherein the annotator determines whether to attach annotations to the first data group and outputs to a first memory of the computer system, in response to the determination, two first confidence levels, wherein each of the two first confidence levels indicates a first certainty of each of two annotations attached to the first data group, and
obtain, from the first memory, the two first confidence levels;
a second obtaining unit to,
transmit a second data group to the annotator, wherein the annotator determines whether to attach annotations to the second data group and outputs to a second memory of the computer system, in response to the determination, two second confidence levels, wherein each of the two second confidence levels indicates a second certainty of each of two annotations attached to the second data group, and
obtain, from the second memory, the two second confidence levels; and
a computing unit to,
retrieve the plurality of first confidence levels from the first obtaining unit and the plurality of second confidence levels from the second obtaining unit, and
compute an estimated value of a correlation between the first plurality of annotations and the second plurality of annotations based on the plurality of first confidence levels and the plurality of second confidence levels, the computing the estimated value of the correlation comprising:
computing two average values $\mu^*a0$ and $\mu^*b0$ by executing operations to calculate an average value of each of the two first confidence levels,
computing two average values $E^*a$ and $E^*b$ by executing operations to calculate an average value of each of the two second confidence levels in the second data group,
computing an average value $E^*ab$ of a product of the two second confidence levels, and
computing an estimated value $c^*$ of the correlation between the two annotations using a formula for computation of a correlation between two annotations.

2. The system of claim 1, wherein:
the first obtaining unit obtains the plurality of first confidence levels by transmitting the first data group to the annotator to determine that annotations should not be attached to the first data group, and
the computing unit computes a plurality of first representative values by executing operations to find a first representative value of each confidence level in the plurality of first confidence levels and compute the estimated value of the correlation by using the plurality of first representative values and the plurality of second confidence levels.

3. The system of claim 2, wherein the computing unit computes the estimated value of the correlation using a formula for computation in which deviation from a reference value of the correlation between the first plurality of annotations and the second plurality of annotations increases in value as a second representative value in the plurality of first representative values increases in value.

4. The system of claim 3, wherein, in the computation of the estimated value of the correlation, the formula includes a term divided by an expression for subtracting a third representative value in the plurality of first representative values from a fourth representative value of a confidence level in the plurality of second confidence levels, and the computing unit increases a value that the expression evaluates.

5. The system of claim 2, wherein the computing unit computes the estimated value of the correlation using a formula for computation in which the plurality of first representative values are used to correct an expression of dividing a second representative value of a product of the plurality of second confidence levels by a product of a plurality of second representative values, wherein the second representative values are obtained by executing operations to find a third representative value of each confidence level in the plurality of second confidence levels.

6. The system of claim 1, further comprising:
a test information obtaining unit to,
obtain test information comprising two pieces of correct answer information indicating whether to attach each annotation from the first plurality of annotations and the second plurality of annotations to a test document group used to test the annotator, and two scores indicating a third certainty of each of the annotations attached to the test document group;

a calculation target information obtaining unit to, obtain calculation target information comprising two scores, each of the two scores indicating a fourth certainty of each annotation from the first plurality of annotations and the second plurality of annotations attached to a calculation target document group used to calculate a correlation between the annotations; and wherein the computing unit, computes the estimated value of the correlation using the test information and the calculation target information.

7. The system of claim 6, wherein the correct answer information is predetermined for each test document of the test document group, the correct answer information indicating whether to attach the annotations.

8. The system of claim 6, wherein the correct answer information is obtained by evaluation of each test document of the test document group, the correct answer information indicating whether to attach the annotations.

* * * * *